United States Patent [19]
van Rumpt et al.

[11] Patent Number: 5,231,662
[45] Date of Patent: Jul. 27, 1993

[54] METHOD AND DEVICE FOR ENCIPHERING DATA TO BE TRANSFERRED AND FOR DECIPHERING THE ENCIPHERED DATA, AND A COMPUTER SYSTEM COMPRISING SUCH A DEVICE

[75] Inventors: Herman W. van Rumpt, HC's-Hertogenbosch; Benny C. T. Kwan, Eindhoven, both of Netherlands

[73] Assignee: Tulip Computers International B.V., Netherlands

[21] Appl. No.: 794,326

[22] Filed: Nov. 12, 1991

Related U.S. Application Data

[63] Continuation of Ser. No. 560,144, Jul. 31, 1990, abandoned.

[30] Foreign Application Priority Data

Aug. 1, 1989 [NL] Netherlands .................. 8901983

[51] Int. Cl.$^5$ ............................................. H04L 9/06
[52] U.S. Cl. ......................................... 380/9; 380/29; 380/33; 380/37; 380/49
[58] Field of Search .................. 380/9, 29, 33, 37, 49, 380/50

[56] References Cited

U.S. PATENT DOCUMENTS

| | | |
|---|---|---|
| 3,798,359 | 3/1974 | Feistel .................... 380/37 |
| 4,160,120 | 7/1979 | Barnes et al. ............ 380/29 |
| 4,172,213 | 10/1979 | Barnes et al. ............ 380/29 |
| 4,274,265 | 6/1981 | Davida et al. ........... 380/29 |
| 4,278,837 | 7/1981 | Best ......................... 380/4 |
| 4,543,646 | 9/1985 | Ambrosius, III et al. ... 380/29 |
| 4,751,733 | 6/1988 | Delayaye et al. ........ 380/37 X |
| 4,780,905 | 10/1988 | Cruts et al. .............. 380/44 |

FOREIGN PATENT DOCUMENTS 0114368  8/1984  European Pat. Off. .

OTHER PUBLICATIONS

A. G. Konheim, *Cryptography, A Primer*, Chapter VI, (John Wiley & Sons, 1981).
A. M. Jackson et al, "Project Universe Encruption Experiment" *G.E.C. Journal of Research*, vol. 2, No. 1, 1984 (Rugby, Great Britain), pp. 30–36.

*Primary Examiner*—Bernarr E. Gregory
*Attorney, Agent, or Firm*—Peter L. Michaelson; Raymond R. Moser, Jr.

[57] ABSTRACT

Method and device for enciphering data words of a word width of n bits, in particular data words to be written in a computer storage, wherein a product cipher circuit comprises alternately one from a plurality of permutation boxes with n inputs and n outputs and one from a plurality of substitution boxes with n inputs and n outputs, each of these boxes being under the control of a specific part of an m-bits key. In the product cipher circuit the data words are consecutively enciphered in whole and the enciphering device can be regarded as a delay line. The data words to be enciphered can be combined with coding words which depend on the specific sector of the computer storage, in particular a hard storage disk unit, where the data words are stored. The sector-specific coding words and/or the m-bits key can be combined with a key to be entered by a user.

31 Claims, 1 Drawing Sheet

METHOD AND DEVICE FOR ENCIPHERING DATA TO BE TRANSFERRED AND FOR DECIPHERING THE ENCIPHERED DATA, AND A COMPUTER SYSTEM COMPRISING SUCH A DEVICE

CROSS REFERENCE TO RELATED APPLICATION

This application is a continuation of our copending patent application Ser. No. 07/560,144, filed on Jul. 31, 1990, now abandoned.

BACKGROUND OF THE INVENTION

1. Field of the Invention

The invention relates to a method and device for enciphering data to be transferred as well as for deciphering the enciphered data, wherein the data are transferred along a bus of a width of n-bits. More particularly, the invention relates to a device and a method wherein the data to be enciphered are intended to be written in a memory and are transferred along a data bus of a width of n-bits.

2. Description of the Related Art

Storing data in a computer memory, such as the hard disk unit of a personal computer, involves a serious risk of unauthorized persons reading out the data stored in the memory or even misappropriating the storage disk to be able to read out the data store without being disturbed. Such risks are the greater according as the use of personal computers increases and more confidential information is stored in their memories. There are software packages which aim to solve the problem described above by first enciphering the data to be written in a memory. A number of these known programs have the drawback that the user must specifically switch them on which may lead to errors, for instance when encipherment is not applied when it should be. A further even greater drawback is the fact that all existing software is slow so that encipherment may lead to undesirable waiting times for the user, which in turn may be a reason for the user to omit encipherment.

U.S. Pat. No. 4,780,905 describes a system for enciphering data to be written in a memory of a personal computer system, in which the data are invariably enciphered. For encipherment a key is used which is a small part of a very long, in particular 64 K bits, key. The key portion to be chosen for a specific encipherment can be chosen depending on the specific location where the data are written in the memory. However, this known system, too, causes a considerable delay in the speed of reading from and writing into the memory.

The object of the invention is to overcome this drawback of the existing software and to that end provides a method of the type described hereinabove, in which the successive data words of a width of n-bits are supplied to a cipher circuit wherein under the control of an m-bits key each data word is consecutively modified a plurality of times. The cipher circuit is preferably a product cipher circuit in which the data word is alternately permuted and substituted a plurality of times.

Product encipherment is a principle of encipherment known from cryptography and for a description of its principle reference can be made to "Kryptographie" by W. Fumy and H. P. Riesz; R. Oldenbourg Verlag München Wien 1988, in particular Chapter 4.1. The principle of product enciphering is used inter alia in DES (Data Encryption Standard), an encryption algorithm for data communication in which the data supply to be enciphered is divided into blocks of 64 bits, which are enciphered by means of a 56-bits key. In DES, however, the blocks are enciphered one by one, i.e. periodically the user must wait until at the input of the product cipher circuit a block to be encoded is available, which makes DES relatively slow.

The principle of the DES algorithm for use in a local area network (LAN) is described in for instance GEC Journal of Research, vol. 2, no. 1, 1984 (Rugby GB) in an article by A. M. Jackson et al.: "Project Universe Encryption Experiment", pp. 30–36. This article describes the various operational modes of DES, in which, however, the principle of encrypting serial blocks of data is invariably maintained.

SUMMARY OF THE INVENTION

The invention is based on the insight that the principles of encryption known from cryptography, and more particularly product enciphering, can be used advantageously in the encryption of data to be written in a memory, when the number of inputs of the (product) cipher circuit equals the width of the data word to be enciphered which is supplied via the data bus. In fact, the product cipher circuit then functions as a delay line included between the data bus supplying the data words and the memory, so that in principle the data words can be processed at the same speed as in the rest of the computer system and the enciphering process does not cause any delay that is noticeable to the user.

For use in the method according to the invention the product cipher circuit may for instance comprise alternately eleven linear permutation boxes, each with a word width of 16 bits, in which the inputs of the first permutation box and the outputs of the last permutation box form the inputs and the outputs, respectively, of the product cipher circuit, and ten groups of four non-linear substitution boxes each, so-called S-boxes, each having a word width of 4 bits. Each permutation box may for instance have four permutations and can then be controlled with a 2-bits key. Each S-box may for instance have two substitution alternatives and can then be controlled with a 1-bit key. In this example the control of the entire product cipher circuit would then require a key of $m = 62$ bits. It will be clear that a person skilled in the art has a great number of options in choosing the number of permutation boxes, the number of substitution boxes, their sequence and the number of permutations and substitutions, and that the example given is only one of a great number of possible variants. The permutation boxes and the S-boxes are implemented in such a way that the product cipher circuit is suitable both for enciphering and for deciphering, and for decipherment the same 62-bits key is used, but with each of the key bits being inverted.

The device according to the invention is characterized by a product cipher circuit comprising alternately one from a plurality of permutation boxes with n inputs and n outputs and one from a plurality of substitution boxes with n inputs and n outputs, with each of the boxes being under the control of a specific part of an m-bits key. When the method according to the invention is used, with the same key one original data word is invariably enciphered into the same enciphered (crypto) word. This principle is known under the name of electronic code book and may have the disadvantage that when a number of original data words and their corresponding crypto words are known, for instance because it concerns publicly known control commands occurring on any memory disk, deciphering the encryption algorithm and finding the key used is facilitated. Obviously this is undesirable.

It is therefore a further object of the invention to provide a method for further improving the method described hereinabove by logically combining each n-bits data word to be enciphered with an n-bits coding word before it is supplied to the cipher circuit, the coding word for the greater part of the data words being derived from the n-bits crypto word at the output of the cipher circuit.

The logic combination is preferably a modulo 2 addition and the word derived from the n-bits crypto word at the output of the cipher circuit is preferably that word itself.

For the initial coding word, the n-bits coding word to be used at the outset of an enciphering process when at the output of the cipher circuit no crypto word is available yet, an n-bits coding word can be used which is entered by the user via the keyboard. When the memory is a hard disk unit, however, it is preferable to make use of the specific sector division of the data on such a disk. Each sector forms a part of one of the concentric storage tracks on the disk. The transfer of data to and from the storage disk is effected sector by sector or by multiples of sectors, one sector comprising for instance 256 data words of 16 bits. According to a preferred embodiment of the invention, therefore, the initial n-bits coding word is formed from a p-bits coding word to be entered by the user once for each cycle of use and a sector-specific r-bits coding word generated by the computer for each new sector to be written. This r-bits coding word is directly related to the sector in which the data to be enciphered are to be written and is determined by a number of or all the following parameters: the number of the read/write head in a disk unit with a plurality of hard disks, and hence a plurality of read/write heads, the side of the disk, the number of the track on that side and the number of the sector on that track. The initial n-bits coding word can then be formed by a logic combination of the p-bits and the r-bits coding word. By the method described hereinabove it is accomplished that one and the same data word, when enciphered, leads to different crypto words in different sectors. Owing to the predetermined combination of the fixed p-bits user's coding word and the r-bits sector-specific coding word uniformly determined by the computer on the basis of the sector data, the initial coding word for deciphering the crypto words in each sector can be uniformly determined so that decipherment will not present any problems, provided, of course, the correct key and the correct p-bits coding word are entered by the user. For decipherment either the initial coding word or the crypto word to be deciphered is combined through a modulo 2 addition with the data word at the output of the cipher circuit so as to obtain the original data word.

Although the m-bits key can in principle be supplied directly to the cipher circuit, in accordance with a further embodiment of the invention, for further improving the encipherment of the data words to be registered, r bits, with embodiment of the invention, for further improving the encipherment of the data words to be registered, r bits, with $r \leq m$, of this key are logically combined with the computer-generated r-bits coding word related directly to a sector. This logic combination is preferably a modulo 2 addition. The r-bits key part obtained by this modulo 2 addition is then supplemented with the m-r bits of the original key so as to obtain an m-bits key again. In this way a different encryption key is obtained for each sector, which further prevents unauthorized decipherment.

The invention further relates to a computer system comprising a central processor and a hard storage disk unit, wherein the device according to the invention is included in the data bus which links the central processor and the storage disk unit.

BRIEF DESCRIPTION OF THE DRAWING

The invention will now be further explained with reference to the accompanying drawing (FIG. 1) showing a block diagram of one embodiment of a device according to the invention.

DETAILED DESCRIPTION

Figure 1:
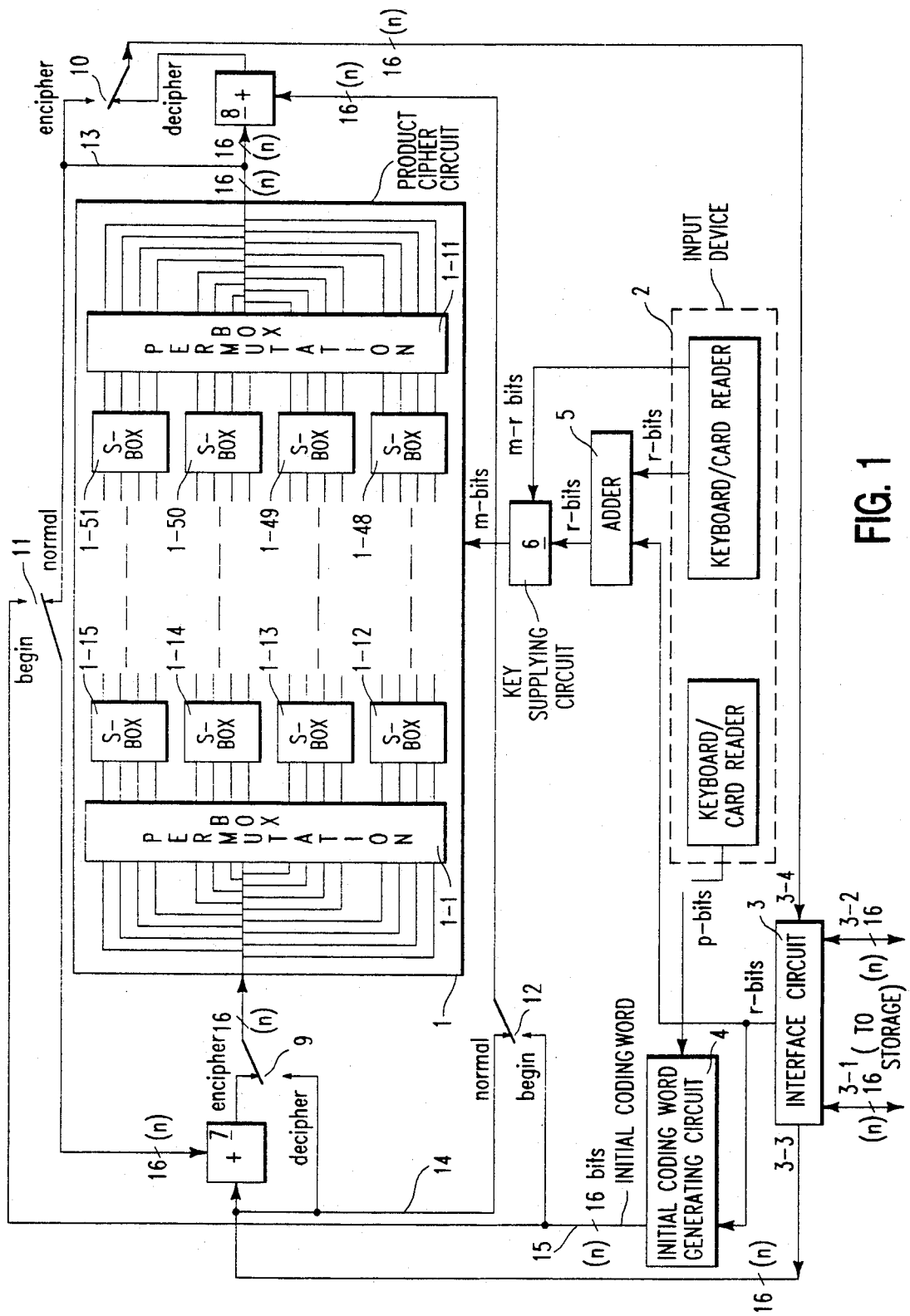

The device according to the embodiment is designed to encipher data words of a width of 16 bits, but can be readily made suitable for data words of a different word width after a number of adaptations which are obvious to a person skilled in the art.

The device comprises a product cipher circuit 1 comprising eleven permutation boxes, 1-1 through 1-11, each having sixteen inputs and sixteen outputs, the sixteen inputs of the permutation box 1-1 forming the inputs of the product cipher circuit for receiving the data word to be enciphered or deciphered, and the sixteen outputs of the permutation box 1-11 forming the outputs of the product cipher circuit for generating the enciphered or deciphered data word. The product cipher circuit 1 further comprises forty non-linear substitution boxes, 1-12 through 1-51, each having four inputs and four outputs. The forty substitution boxes, known as S-boxes, are divided into ten groups of four S-boxes each, one such group being arranged in the circuit 1 between each pair of permutation boxes, with the 4×4 inputs of one group of S-boxes being linked to the sixteen outputs of the preceding permutation box and the 4×4 outputs of a group of S-boxes being linked to the sixteen inputs of the next permutation box, so that data words of 16-bits width are alternately permuted and substituted. The data words supplied to the input of the product cipher circuit 1 are continuously enciphered or deciphered, the circuit 1 in fact functioning as a delay line whose delay is determined by the switching time of the various permutation and substitution boxes. The permutation boxes 1-1 through 1-11 each have four different permutations, so that each permutation box can be controlled with a key word of two bits. Each S-box 1-12 through 1-51 has two different substitution alternatives, so that each S-box can be controlled with a key word of one bit. For setting a specific encipherment by the product cipher circuit 1, therefore, a key is required of $(11 \times 2)+(40 \times 1)=62$ bits. This key is supplied from a circuit 6 to be further discussed hereinafter. Parts of two bits and of one bit of this key are supplied to control inputs (not shown for the sake of clarity) of the respective boxes 1-1 through 1-11 and 1-12 through 1-51.

The apparatus according to the invention comprises an input device 2, such as a keyboard or a credit card reader, for entering key words. An interface circuit 3 forms the link between on the one hand the computer with the storage and on the other the cipher device according to the invention. To that end the interface circuit comprises a bidirectional data bus 3-1 which is linked to the storage in the form of for instance a hard disk unit, and a bidirectional data bus 3-2 for maintaining the link with other components of the computer and for transferring the data to be read from or written in the storage. The data words to be enciphered or deciphered are supplied to the product cipher circuit 1 via a data bus 3-3, and from this circuit the enciphered or deciphered data words are supplied to the interface circuit 3 again via a data bus 3-4.

The device further comprises a pair of two-way switches 9 and 10 which in a first position, shown in the drawing, ensure that the device according to the invention operates as an enciphering circuit and in the second position ensure that it operates as a deciphering circuit.

As explained hereinabove, in a number of cases it may be a disadvantage that identical data words are enciphered with one and the same key to one and the same crypto word. To offer a solution to this problem, modulo 2 adding circuits 7 and 8 are provided for encipherment and decipherment, respectively. When being enciphered, the enciphered data word, at the output of the product cipher circuit 1 is fed back via a bus 13 to a first input of the modulo 2 adder 7, whose second input receives the data word to be enciphered. In this way due to the feedback from the output of the circuit 1, the same data word supplied at the second input of the modulo 2 adder is converted into a different crypto word each time.

In the deciphering process the data word, at the output of the product cipher circuit 1, is supplied to a first input of the modulo 2 adder 8, whose second input receives the data word to be deciphered via a bus 14. At the output of the modulo 2 adder the correct deciphered data word is then available again.

To ensure reliable decipherment it is naturally necessary that the data words to be deciphered are supplied in the same sequential order as in which they were enciphered. To this end it is advantageous to use the fact that data are recorded sectorwise on a hard disk, with each sector comprising for instance 512 bytes, so 256 data words, and that writing and reading out data words is invariably done by one or more sectors at the same time. Therefore encipherment, by means of feedback from the output of the product cipher circuit 1 and the modulo 2 addition, is effected sectorwise, so that the sequential order of the enciphered data words is fixed in the deciphering process. To that end a pair of two-way switches 11 and 12 are provided, shown in the drawing in the position which they are in during the enciphering and deciphering process of all data words of a sector, except for the first data word thereof. When the first data word of each new sector is enciphered, the feedback from the output of the product cipher circuit 1 via bus 13 to the first input of the modulo 2 adder 7 is interrupted by means of the switch 11 and via a data bus 15 an initial coding word of 16 bits is supplied to this input. In the same way, in the deciphering process the initial coding word is supplied to the first input of the modulo 2 adder 8 by means of the switch 12.

The initial coding word comprises specific data for each sector and is determined by a number or all of the following parameters: the number of the read/write head in a disk unit with a plurality of hard disks, and hence a plurality of read/write heads, the side of the disk, the number of the track on that side and the number of the sector on that track. A sector-specific coding word consisting of r bits is generated by the computer and is supplied to a circuit 4 where it is combined with a p-bits key to be entered by the user for instance via a keyboard, to form the initial coding word of 16 bits. Making the initial coding word for each sector dependent on specific data unique for each sector prevents identical data words in different sectors from being enciphered to one and the same crypto word, which improves the quality of encipherment.

Finally, the device according to the invention preferably has the property that the key supplied to the product cipher circuit 1 is also different for each sector of the hard disk. To that end, from an m-bits key entered by the user an r-bits part is supplied to a first input of a modulo 2 adder 5, to the second input of which the computer-generated sector-specific r-bits coding word is supplied. In a circuit 6 the r-bits word formed by the modulo 2 adder 5 is supplemented again with the remaining m-r bits of the key, which were not supplied to the modulo 2 adder 5, so as to form a complete key of m bits again. The fact that according to this variant of the invention also the m-bits key for circuit 1 is different for each sector further prevents unauthorized decipherment.

It is observed that the basic principle of the invention, the encipherment of n-bits data words by means of a product cipher circuit, can not only be applied to the storage and reading out of data in various types of storage devices, but also in data communication in general and that the use of a sector-specific coding word in enciphering data words and/or modifying the m-bits key can be applied in all those cases where storage devices are used in which the data are stored in predetermined fixed frames and where one or more complete frames are written or read out at a time. Accordingly, the use of a sector-specific coding word is not limited to the use in the product cipher circuit according to the embodiment, but it can also be used in other ciphering circuits in which consecutive, n-bits data words are enciphered.

We claim:

1. A method of enciphering data comprising the steps of:

logically combining consecutive ones of a plurality of n-bit data words to be enciphered with an n-bit coding word so as to yield consecutive ones of resulting n-bit words;

varying a value of the n-bit coding word prior to logically combining the n-bit coding word with a next successive one of said n-bit data words to be enciphered in order to yield a corresponding one of the resulting n-bit words;

supplying consecutive n-bit words to a product cipher circuit;

modifying, in said product cipher circuit and under the control of an m-bit key, each one of said n-bit words a plurality of times in a corresponding plurality of consecutive modification stages of said product cipher circuit to yield a corresponding enciphered data word, wherein each of said modification stages and n and m are both pre-defined integers; said modifying step comprising the step of:

successively and alternately permuting and substituting said each n-bit word a plurality of times under the control of said key.

2. The method according to claim 1 further comprising the step of deriving the n-bit coding word from an n-bit enciphered word appearing at the output of the cipher circuit.

3. The method according to claim 2 wherein the n-bit coding word is identical to the enciphered word.

4. The method according to claim 1 in which the n-bit data words are stored sectorwise in a storage device and further comprising the step of forming the resulting n-bit coding word from an r-bit coding word, the r-bit coding word being generated for each new sector to be written and being directed related to the sector into which the resulting n-bit data words, which are to be enciphered, are to be written, where r is a pre-defined integer having a value less than or equal to m.

5. The method according to claim 4 further comprising the step of determining the r-bit coding word in response to at least one of the following parameters: a number of a read/write head in a disk unit having a plurality of hard disks, a side of a disk in the unit, a number of a track on the side and a number of the sector on the track.

6. The method according to claim 5 further comprising the step of forming the n-bit coding word by a logical combination of the r-bit coding word and a p-bit coding word, said p-bit coding word being entered by a user.

7. A method of deciphering enciphered data comprising the steps of:

supplying consecutive n-bit enciphered words to a product cipher circuit;

modifying, in said product cipher circuit and under the control of an m-bit key, each one of said n-bit enciphered words a plurality of times in a corresponding plurality of consecutive modification stages of said product cipher circuit to yield a corresponding one of a plurality of deciphered data words, wherein each of said n-bit enciphered words is modified only once by each one of said modification stages and n and m are both pre-defined integers; said modifying step comprising the step of:

successively and alternately permuting and substituting said each n-bit enciphered word a plurality of times under the control of said key; and said method further comprises the steps of:

logically combining consecutive ones of the deciphered words with an n-bit coding word so as to yield consecutive ones of n-bit deciphered data words; and varying a value of the n-bit coding word prior to logically combining the n-bit coding word with a next successive one of said n-bit deciphered words in order to yield a current corresponding one of the n-bit deciphered data words.

8. The method according to claim 7 further comprising the step of deriving the n-bit coding word from the n-bit enciphered data word appearing at the input of the cipher circuit.

9. The method according to claim 8 wherein the n-bit coding word is identical to the enciphered data word.

10. The method according to claim 7 in which the n-bit enciphered data words are stored sectorwise in a storage device and further comprising the step of forming the n-bit coding word from an r-bit coding word, the r-bit coding word being generated for each new sector to be written and being directed related to the sector into which the n-bit enciphered data words, which are to be deciphered, are to be read, where r is a pre-defined integer having a value less than or equal to m.

11. The method according to claim 10 further comprising the step of determining the r-bit coding word in response to at least one of the following parameters: a number of a read/write head in a disk unit having a plurality of hard disks, a side of a disk in the unit, a number of a track on the side and a number of the sector on the track.

12. The method according to claim 11 further comprising the step of forming the n-bit coding word by a logical combination of the r-bit coding word and a p-bit coding word, said p-bit coding word being entered by a user.

13. Apparatus for enciphering n-bit data words comprising:

a product cipher circuit, having as input signals consecutive n-bit words and an m-bit key, producing a sequence of corresponding enciphered n-bit data words and having alternately one from a plurality of permutation boxes with n inputs and n outputs and one from a plurality of substitution boxes with n inputs and n outputs, each of said permutation and substitution boxes being under the control of a specific part of the m-bit key, wherein each consecutive one of the n-bit words is permuted or substituted only once by each respective one of said permutation and substitution boxes and n and m are pre-defined integers; and a modulo 2 adder wherein a first input to said adder receives n-bit data words to be enciphered, a second input to the adder is linked to the output of the product cipher circuit and receives the n-bit enciphered data words and the output of the adder is linked to and provides said n-bit words to an input of the product cipher circuit, wherein the adder logically combines each one of the n-bit enciphered data words produced by said product cipher circuit with a next successive one of said n-bit data words to be enciphered in order to yield a corresponding one of the n-bit words.

14. The apparatus of claim 13 further comprising switching means for linking at predetermined points in time the second input of the modulo 2 adder to a circuit which generates an n-bit initial coding word.

15. The apparatus of claim 14 further comprising means for forming the n-bit initial coding word from an r-bit coding word generated by a computer linked to the apparatus and a p-bit coding word entered by a user.

16. The apparatus in claim 15 further comprising a second modulo 2 adder wherein a first input of said second adder receives the r-bit coding word, a second input to said second adder receives an r-bit portion of the m-bit key and an output of said second adder is linked to a circuit for combining an r-bit output of the second adder and remaining m-r bits of the key to form the m-bit key to be supplied to the product cipher circuit.

17. Apparatus for deciphering n-bit enciphered data words comprising:

a product cipher circuit, having as input signals consecutive n-bit enciphered words and an m-bit key, for producing a sequence of corresponding deciphered n-bit data words and having alternately one from a plurality of permutation boxes with n inputs and n outputs and one from a plurality of substitution boxes with n inputs and n outputs, each of said permutation and substitution boxes being under the control of a specific part of the m-bit key, wherein each consecutive one of the n-bit enciphered words is permuted or substituted only once by each respective one of said permutation and substitution boxes and n and m are pre-defined integers; and a modulo 2 adder wherein a first input to said adder is linked to the output of the product cipher circuit and receives the deciphered n-bit data words, a second input to the adder is linked to an input to the product cipher circuit and receives the enciphered n-bit data words to be deciphered and an output of the adder provides the deciphered n-bit enciphered data words, wherein the adder logically combines each one of the deciphered n-bit words produced by said product cipher circuit with a next successive one of said enciphered n-bit data words to be deciphered in order to yield a current corresponding one of the deciphered n-bit words.

18. The apparatus in claim 17 further comprising switching means for linking at predetermined points in time the second input of the modulo 2 adder to a circuit which generates an n-bit initial coding word.

19. The apparatus in claim 18 further comprising means for forming the n-bit initial coding word from an r-bit coding word generated by a computer linked to the apparatus and a p-bit coding word entered by a user.

20. The apparatus in claim 19 further comprising a second modulo 2 adder wherein a first input of said second adder receives the r-bit coding word, a second input to said second adder receives an r-bit portion of the m-bit key and an output of said second adder is linked to a circuit for combining an r-bit output of the second adder and remaining m-r bits of the key to form the m-bit key to be supplied to the product cipher circuit.

21. A computer system comprising:
a central processor;
a hard disk storage unit;
a bus linking the central processor and the disk storage unit; and
means, connected to said bus, for enciphering n-bit data words as said data words are transferred, along the bus, between said central processor and said hard disk storage unit, said enciphering means comprising:
a product cipher circuit, having as input signals consecutive n-bit words and an m-bit key, producing a sequence of corresponding enciphered n-bit data words and having alternately one from a plurality of permutation boxes with n inputs and n outputs and one from a plurality of substitution boxes with n inputs and n output, each of said permutation and substitution boxes being under the control of a specific part of the m-bit key, wherein each consecutive one of the n-bit words is permuted or substituted only once by each respective one of said permutation and substitution boxes and n and m are pre-defined integers;
a modulo 2 adder wherein a first input to said adder receives n-bit data words to be enciphered, a second input to the adder is linked to the output of the product cipher circuit and receives the n-bit enciphered data words and the output of the adder is linked to and provides said n-bit words to an input of the product cipher circuit, wherein the adder logically combines each one of the n-bit enciphered data words produced by said product cipher circuit with a next successive one of said n-bit data words to be enciphered in order to yield a corresponding one of the n-bit words; and
switching means for linking at predetermined points in time the second input of the modulo 2 adder to a circuit which generates an n-bit initial coding word.

22. The system in claim 21 wherein said enciphering means further comprising means for forming the n-bit initial coding word from an r-bit coding word generated by a computer linked to the apparatus and a p-bit coding word entered by a user.

23. The system in claim 22 wherein said enciphering means further comprises a second modulo 2 adder wherein a first input of said second adder receives the r-bit coding word, a second input to said second adder receives an r-bit portion of the m-bit key and an output of said second adder is linked to a circuit for combining an r-bit output of the second adder and remaining m-r bits of the key to form the m-bit key to be supplied to the product cipher circuit.

24. A computer system comprising:
a central processor;
a hard disk storage unit;
a bus linking the central processor and the disk storage unit; and
means, connected to said bus, for enciphering n-bit enciphered data words as said enciphered data words are transferred, along the bus, between said central processor and said hard disk storage unit, said deciphering means comprising:
a product cipher circuit, having as input signals consecutive n-bit enciphered words and an m-bit key, producing a sequence of corresponding deciphered n-bit data words and having alternately one from a plurality of permutation boxes with n inputs and n outputs and one from a plurality of substitution boxes with n inputs and n output, each of said permutation and substitution boxes being under the control of a specific part of the m-bit key, wherein each consecutive one of the n-bit enciphered words is permuted or substituted only once by each respective one of said permutation and substitution boxes and n and m are pre-defined integers;
a modulo 2 adder wherein a first input to said adder is linked to the output of the product cipher circuit and receives the deciphered n-bit data words, a second input to the adder is linked to an input to the product cipher circuit and receives the enciphered n-bit data words to be deciphered and an output of the adder provides the deciphered n-bit enciphered data words, wherein the adder logically combines each one of the deciphered n-bit words produced by said product cipher circuit with a next successive one of said enciphered n-bit data words to be deciphered in order to yield a current corresponding one of the deciphered n-bit words; and
switching means for linking at predetermined points in time the second input of the modulo 2 adder to a circuit which generates an n-bit initial coding word.

25. The system in claim 24 wherein said deciphering means further comprises means for forming the n-bit initial coding word from an r-bit coding word generated by a computer linked to the apparatus and a p-bit coding word entered by a user.

26. The system in claim 25 wherein said deciphering means further comprises a second modulo 2 adder wherein a first input of said second adder receives the r-bit coding word, a second input to said second adder receives an r-bit portion of the m-bit key and an output of said second adder is linked to a circuit for combining an r-bit output of the second adder and remaining m-r bits of the key to form the m-bit key to be supplied to the product cipher circuit.

27. A method of enciphering data comprising the steps of:
logically combining consecutive ones of a plurality of n-bit data words to be enciphered with an n-bit coding word so as to yield consecutive ones of resulting n-bit words;
varying a value of the n-bit coding word prior to logically combining the n-bit coding word with a next successive one of said n-bit data words to be enciphered in order to yield a corresponding one of the resulting n-bit words;
supplying consecutive n-bit words to a product cipher circuit;
modifying, in said product cipher circuit and under the control of an m-bit key, each one of said n-bit words a plurality of times in a corresponding plurality of consecutive modification stages of said product cipher circuit to yield a corresponding enciphered data word, wherein n and m are both pre-defined integers; said modifying step comprising the step of:
successively and alternately permuting and substituting said each resulting n-bit word a plurality of times under the control of said key.

28. The method according to claim 27 wherein the n-bit coding word is identical to the enciphered word.

29. The method according to claim 27 in which the resulting n-bit data words are stored sectorwise in a storage device and further comprising the step of forming the n-bit coding word from an r-bit coding word, the r-bit coding word being generated for each new sector to be written and being directed related to the sector into which the resulting n-bit data words, which are to be enciphered, are to be written, where r is a pre-defined integer having a value less than or equal to m.

30. The method according to claim 29 further comprising the step of determining the r-bit coding word in response to at least one of the following parameters: a number of a read/write head in a disk unit having a plurality of hard disks, a side of a disk in the unit, a number of a track on the side and a number of the sector on the track.

31. The method according to claim 30 further comprising the step of forming the n-bit coding word by a logical combination of the r-bit coding word and a p-bit coding word, said p-bit coding word being entered by a user.

* * * * *

UNITED STATES PATENT AND TRADEMARK OFFICE
CERTIFICATE OF CORRECTION

PATENT NO. : 5,231,662
DATED : July 27, 1993
INVENTOR(S) : Van Rumpt, et. al.

It is certified that error appears in the above-indentified patent and that said Letters Patent is hereby corrected as shown below:

Column 6, Claim 1, line 60, after "wherein", insert --each of said n-bit words is modified only once by--;

Column 7, Claim 4, line 10, change "directed" to --directly--;

Column 7, Claim 10, line 66, change "directed" to --directly--; and

Column 12, Claim 29, line 13, change "directed" to --directly--.

Signed and Sealed this

Seventh Day of June, 1994

Attest:

BRUCE LEHMAN

*Attesting Officer*      *Commissioner of Patents and Trademarks*